United States Patent [19]

Sugimura

[11] Patent Number: 4,633,910
[45] Date of Patent: Jan. 6, 1987

[54] PULSATION ABSORBING MEANS HAVING ONE OR MORE VALVE SHOES DIVIDED INTO TWO PARTS EACH DISPLAYS SUITABLE FUNCTION

[76] Inventor: Nobuyuki Sugimura, 308, Mabase, Shimizu-shi, Shizuoka-ken, Japan

[21] Appl. No.: 753,103

[22] Filed: Jul. 9, 1985

[30] Foreign Application Priority Data

Jul. 11, 1984 [JP] Japan .................. 59-104586[U]
Aug. 31, 1984 [JP] Japan .................. 59-182382

[51] Int. Cl.⁴ .......................................... F16L 55/02
[52] U.S. Cl. ................................. 138/30; 251/61.1
[58] Field of Search ................... 138/30; 92/92; 251/61.1

[56] References Cited

U.S. PATENT DOCUMENTS

| | | | |
|---|---|---|---|
| 2,659,391 | 11/1953 | Berger | 92/92 X |
| 2,932,322 | 4/1960 | Mercier | 138/30 |
| 3,082,793 | 3/1963 | Sugimura | 138/30 |
| 3,182,685 | 5/1965 | Mercier | 138/30 |
| 3,380,480 | 4/1968 | Bleasdale | 138/30 |
| 3,406,722 | 10/1968 | Ruth | 138/30 |
| 3,483,892 | 12/1969 | Sugimura et al. | 251/61.1 X |
| 4,432,393 | 2/1984 | Mills | 138/30 |

FOREIGN PATENT DOCUMENTS

| | | | |
|---|---|---|---|
| 1298795 | 7/1969 | Fed. Rep. of Germany | 138/30 |
| 646410 | 6/1966 | Japan | 138/30 |

Primary Examiner—Stephen Marcus
Assistant Examiner—Mark Thronson
Attorney, Agent, or Firm—Wood, Dalton, Phillips, Mason & Rowe

[57] ABSTRACT

In this pulsation absorbing device, a cylindrical resilient protective diaphragm and an inner cylinder formed with one or more communicating holes are disposed within a cylindrical pressure vessel being in concentrical with each other.

Along the outer surface of the inner cylinder one or more arched resilient valve members and one or more leaf springs being laminated with each other are disposed capable of being raised or lowered depend upon the extent of the fluid pressure, thereby the arched valve member can be separated in its function of valve action and spring property, therefore the both members are strengthened by the lamination as well as their deformation and extent of fatigue can be kept minimum.

7 Claims, 18 Drawing Figures

PULSATION ABSORBING MEANS HAVING ONE OR MORE VALVE SHOES DIVIDED INTO TWO PARTS EACH DISPLAYS SUITABLE FUNCTION

BACKGROUND OF THE INVENTION

1. Field of the Invention

This invention relates to a fluid pressure device applicable to an oil hydraulic system and also to a hydraulic system, and more particularly, to a pulsation damping or absorbing means or device for preventing fluid hammering or pulsation from occurring in a fluid pressure device and can also be used to transfer such fluid.

2. Prior Art

As a kind of this apparatus, there is one which comprises, a cylindrical pressure vessel, an inlet and an outlet, a cylindrical resilient diaphragm and an inner cylinder within said pressure vessel, both of which are disposed concentrical with each other. The inner cylinder is formed with a plurality of communicating holes on its outer surface in order to provide for passage through the cylinder wall of fluid under pressure. One or more resilient valve shoes of arcuated shape, namely arched leaf spring are located, each being coupled to the inner cylinder by pins to cover the communicating holes so as to prevent the resilient diaphragm member from being damaged when it is pushed into the communicating holes. (See Japanese Patent No. 646410 and U.S. Pat. No. 3,483,892). It is necessary for this arched leaf springs to be fabricated with such a thickness enough to have a strength that the leaf spring do not enter into the communicating holes when they are urged by the diaphragm toward the communicating holes, so that the arched leaf springs do not damage the resilient diaphragm.

If the thickness of the spring is made excessively large, however, the arched leaf spring would become difficult to be deformed, then they are not able to tightly contact the arched contour of the inner cylinder to completely close the communicating holes even when they are urged by the resilient diaphragm, thereby the resilient diaphragm member will enter into the gap formed between the inner cylinder and the leaf spring. Thus it becomes necessary to select the thickness of the arched leaf spring enough to satisfy the above requirement, however, such a leaf spring 1, under the flow of fluid in a direction as shown by arrow mark A3 shown in FIG. 18, would be caused to jump upward at their two opposite transverse side edges 1a and 1b by the force of the fluid, while being held by the pin 4. Consequently, there arises a concentration of fluid force on the leaf spring 1 caused by the flow of the fluid around the vicinity of the pin 4, which would result in damage of the leaf spring at that portion.

SUMMARY OF THE INVENTION

In view of the drawbacks mentioned above, this invention aims to prevent such drawbacks from occurring by breaking down the strength and the function of the arched valve member as a whole into separate ones attained by separate parts, thereby reducing the amount of elastic deformation of respective resilient valve member and spring member.

In summary, the present invention is a pulsation absorbing means or a damping device, which comprises, within its cylindrical pressure vessel, a cylindrical resilient diaphragm, an inner cylinder formed therearound with a plurality of communicating holes and both of them are disposed concentrical with each other and with the pressure vessel, and one or more valve member of arched shape in transverse cross section being disposed along the outer surface of the inner cylinder and at the position of the communicating holes and capable of being raised or lowered, wherein each valve member consists of two parts being separated for two functions suitable for each object, respectively, of satisfying required strength and of valve action, whereby; the gas in the gas chamber will expand and the resilient diaphragm will tightly contact the inner cylinder, however, immediately before such moment of contact, the resilient diaphragm urges a leaf spring, through an arched resilient valve shoe along the outer surface of the inner cylinder in such a direction that the arched shape of the spring expands to cover and close the communicating holes by discharging the fluid therefrom. On the contrary, increase of the hydraulic fluid pressure would cause the depression of the leaf spring by a fluid pressure through the communicating holes, however, the leaf spring, because of its state of being held by a resilient valve shoe, is enabled to have higher rigidity, displays less extent of deformation when it is urged to jump, thereby it can obviate the problem of being damaged or spoiled.

BRIEF DESCRIPTION OF THE DRAWINGS

FIGS. 6 through 9 are plan views showing other embodiments, among which FIGS. 6-8 are views correspondingly to that shown in FIG. 5;

FIG. 9 is a view that is correspondingly similar to the embodiment of FIG. 5;

FIG. 14-17 are views showing still further embodiments of the present invention, among which FIG. 14 is an enlarged view of the main part corresponding to that shown in FIG. 2;

FIG. 15 is a perspective view of the main part shown in FIG. 14;

FIGS. 16 and 17 are views showing the function of the above embodiment and

PREFERRED EMBODIMENTS

Figure 1:
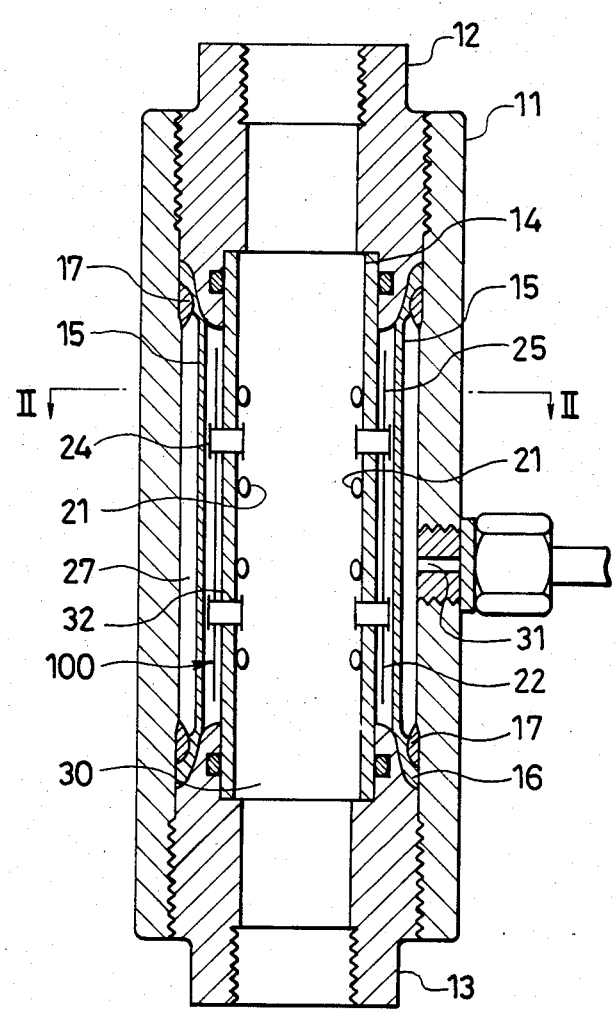
FIG. 1 is a sectional elevation showing an embodiment of the present invention.

Explanation will now be made on some typical embodiments of the present invention by referring to accompanying drawings.

An inlet cylinder 12 and an outlet cylinder 13 are threadedly plugged in at one axial end and the other axial end, respectively, of a cylindrical pressure vessel 11, and these two cylindrical members 12 and 13 cooperatively clamp an inner cylinder 14 at both axial ends. Around the outer surface of the inner cylinder 14, a cylindrical resilient diaphragm 15 fabricated of resilient material such as rubber or elastomer is concentrically disposed. Radially and axially extending flange portions 16 at both axial ends are clamped between a retaining ring 17 and the inlet cylinder 12 and between the other retaining ring 17 and the outlet cylinder 13, respectively.

In the drawings, numeral 100 denotes an arched valve member consisting of an arched leaf spring 22 and a resilient valve body or valve shoe 25.

In addition, a plurality of communicating holes 21 are formed in and pass through the wall of the inner cylinder 14, between which communicating holes 21 and the resilient diaphragm member 15, one or more arched leaf spring 22 are interposed being coupled to the inner cylinder by one or more pins 24 radially slidable relative to the both members to be coupled. In addition, an arched resilient valve member or shoe 25 to be laminated with each leaf spring 22 is interposed between the leaf spring 22 and the head 24a of the pin 24.

Figure 2:
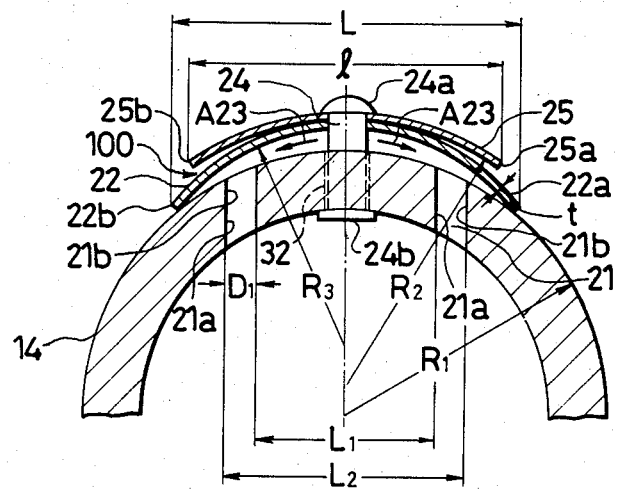
FIG. 2 is a sectional plan view taken along line II—II of FIG. 1 showing a major part of the invention in enlarged view.

The leaf springs 22, by virtue of its own resiliency, can normally be raised at their transverse intermediate portion away from the outer surface of the inner cylinder 14, while their transverse side edges 22a and 22b are kept in contact with the outer surface of the inner cylinder 14, as shown in FIG. 2.

The inside radius R2 of the resilient valve shoe 25 is fabricated to be equal to the sum of outside radius R1 of the inner cylinder R1 plus thickness t of the leaf spring 22, while the radius R3 of the leaf spring 22 is smaller than the outside radius R1 of the inner cylinder 14, ($R_2 \approx R_1 + t$, $R_3 < R_1$).

The transverse length L of the leaf spring 22 is larger than that of both the length $L_2$ between the outside walls of the two adjacent communicating holes 21 and the transeverse length 1 of the resilient valve shoe 25, which is larger than the distance $L_1$ between the inside walls 21a of the two adjacent communicating holes 21 of the inner cylinder 14. ($L > 1 > L_1$).

Longitudinal length H of the leaf spring is larger than the length h of the resilient valve shoe 25. In addition, the width D of the middle trunk portion of the leaf spring is larger than the width d of the middle trunk portion of the resilient valve shoe 25, and the width d is larger than the diameter of the head 24a of the pin. (H>h, D>d).

The width B of the branched portion 22c of the leaf spring 22 is smaller than the width b of the branched portion 25c of the resilient valve shoe 25, which width b is larger than the diameter $D_1$ of the communicating hole. ($B > b > D_1$).

Figure 4:
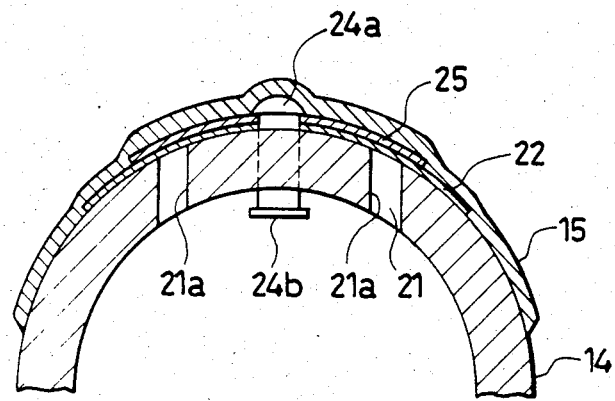

When fluid pressure of the fluid flowing from the inlet cylinder 12 toward the outlet cylinder 13 decreases allowing, the pressure of the gas in the pressure chamber 27 defined between the resilient diaphragm 15 and the pressure vessel 11, to exceed the fluid pressure such that the resilient diaphragm 15 can be urged toward the center of the inner cylinder 14, the head 24a of the pin 24 is urged toward the center by the resilient diaphragm 15, so the transverse side edges 25a and 25b of the resilient valve shoe 25 and those side edges 22a and 22b of the leaf spring 22 would slide in the direction as shown in the arrow line A23 to change their shapes to widen the arched shape in cross section, as a whole, finally, they change their shape from that shown in FIG. 2 to that of FIG. 4, then the communicating holes 21 of the inner cylinder 14 is completely covered by the leaf spring 22.

Next, if the hydraulic pressure within the inner cylinder 14 increases over the gas pressure in the gas chamber 27, the fluid urges the leaf spring 22 and the resilient valve shoes 25 to move upward, then the liquid flows through the communicating holes 21 toward the direction shown by the arrow line A21 and further passing through the side faces of the branched portion 22c of the leaf spring, thereby urges and widens the resilient diaphragm 15 toward the inner face of the pressure vessel. At this moment, the portion 22d of the leaf spring right above the communicating hole 21 is apt to be deformed under large extent of fluid force, however, since there arises large reaction force, there is almost no fear of causing any large extent of deformation.

Figure 3:
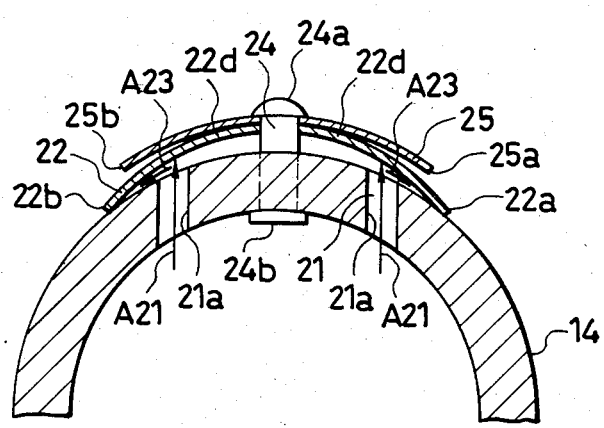
FIGS. 3 and 4 are views showing function of the above-mentioned embodiment.

Accordingly, the leaf spring 22 changes its shape from the state shown in FIG. 4 to that shown in FIG. 2 through the state almost similar to that shown in FIG. 3, thereby the communicating holes 21 of the inner cylinder can be completely opened.

Figure 5:
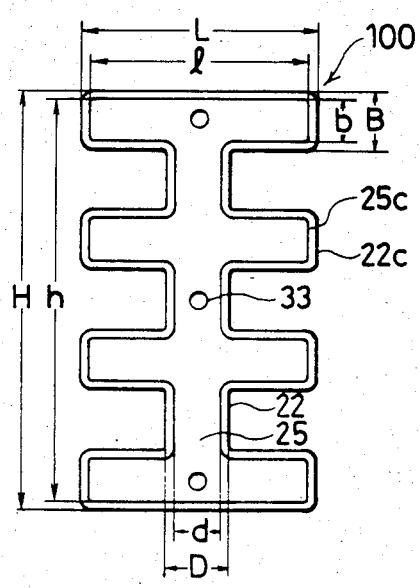
FIG. 5 is a plan view showing the major part shown in FIG. 2.

In FIG. 1, 30 is a flow passage of the hydraulic fluid and 31 denotes a gas supply port, through which a suitable gas such as nitrogen is previously introduced to maintain the interior of the gas chamber at a desired pressure. Numeral 32 denotes suitable number of through holes on the inner cylinder 14 which has been formed separately from the communicating holes 21, and 24b is a rear end of the pin 24 (FIG. 2), which together with a head 24a of the pin act as stoppers. 33 is a pin hole opened, through both the leaf spring 22 and the resilient valve member 25 (FIG. 5). As explained above, the portion of the valve above the communicating holes and adjacent thereto is held by an arched resilient valve member or shoe having high proof strength for pressure when working fluid may flowing therein, therefore, there arises no appreciable extent of deformation over its allowable limit.

Since such deformation is of such an extent that does not bring about any permanent set, the damage of the leaf spring can be prevented from occuring.

It was confirmed through testing by applying fluctuating load of fluid force $P(Kg/Cm^2)$ to leaf spring specimens, that the specimens of conventional type without having any resilient valve member were damaged after about 80,000 times cyclic loading, while the resilient valve member type specimens according to the present invention were not damaged even after having been subjected to 7,500,000 times cyclic loading under entirely the same test condition.

Figure 6:
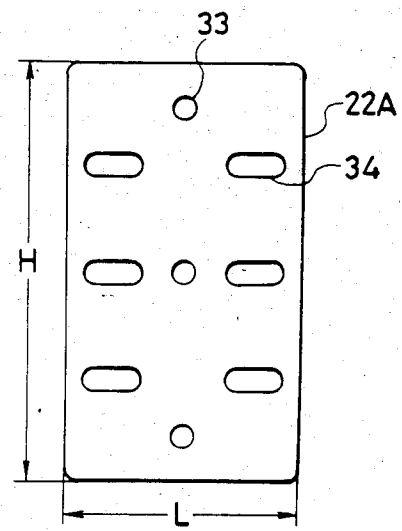

The present invention shall not be construed to be limited to the embodiments as described above, but can be practiced in many other way, for example, as shown in FIG. 6 the leaf spring 22 may be formed with pin holes 33 along its central axis together with oblong holes 34 at the positions, corresponding to those of the recessed portion defined between the branched portion 22c of the leaf spring 22 of the aforesaid embodiment.

Figure 7:
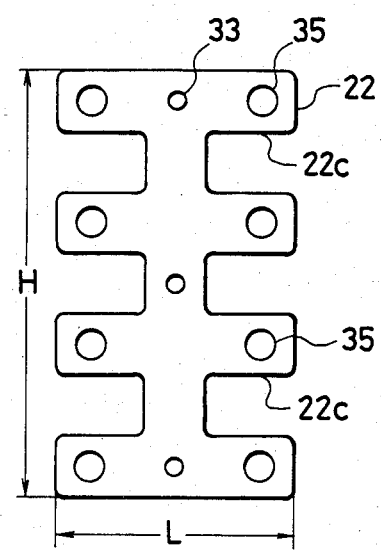
Figure 8:
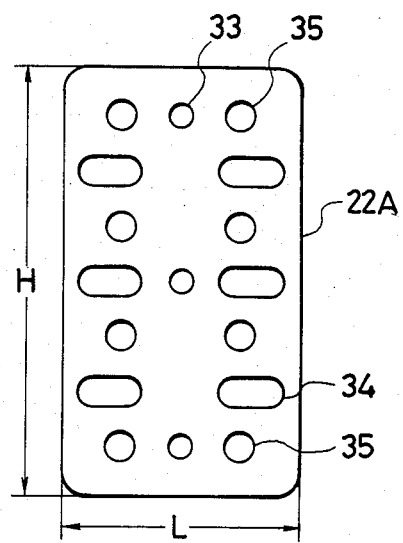

In another way, if other form of communicating holes 35 are added, as shown in FIGS. 7 and 8 , to the leaf spring 22 and 22A shown in FIGS. 5 and 6, fluid is allowed to flow through these holes 35, therefore, the fluid force acting on the plate face of the leaf spring 22 and 22A would be reduced accompanying reduction of the fatigue of the leaf spring under subject forces.

Figure 9:
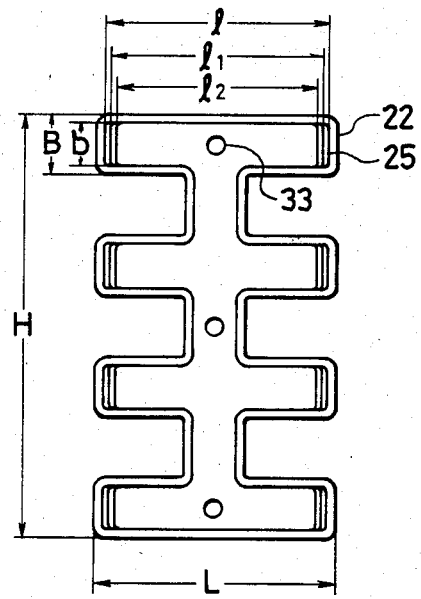

Though a plurality of resilient valve member of same size may be laminated one after another, it is also preferable, as shown in FIG. 9, to reduce transverse length of these spring leaf 1, $1_1$, $1_2$ one after another. ($1 > 1_1 > 1_2$).

Figure 10:
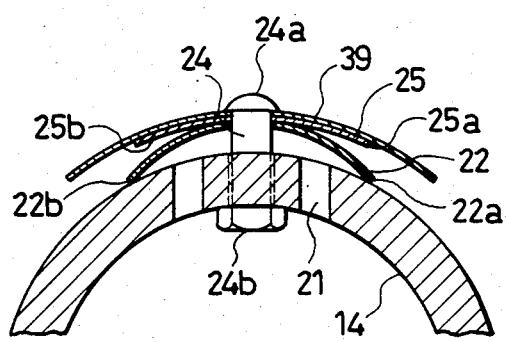
FIG. 10 is a sectional view showing a further embodiment of the invention.

Moreover, as shown in FIG. 10, if a protecting member 39 having a surface area, larger than that of either of the leaf spring 22 or resilient valve member, fabricated for example, of Teflon (trade mark) is disposed at the radially outerside of the resilient valve member 25, the resilient diaphragm would no more directly contact either with the leaf spring 22 or the resilient valve 25 member or valve shoes.

Accordingly, since there is no fear that the resilient diaphragm 15 enter into or be pinched between the gap formed either between the inner cylinder 14 and the transverse side edges 22a and 22b of the leaf spring 22 or that formed between the leaf spring 22 and the transverse side edges 25a and 25b of the resilient valve member 25, the damage of the resilient diaphragm can be prevented in more effective manner.

Figure 13:
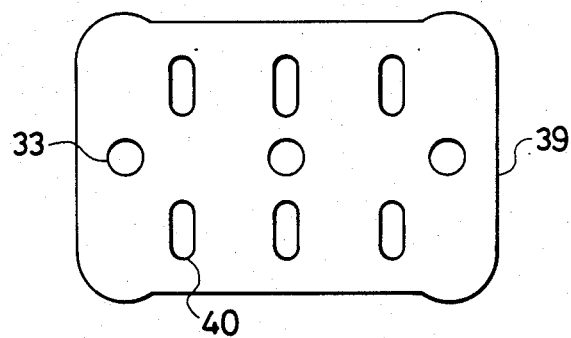
FIG. 13 is a plan view showing another embodiment of the invention.
Figure 14:
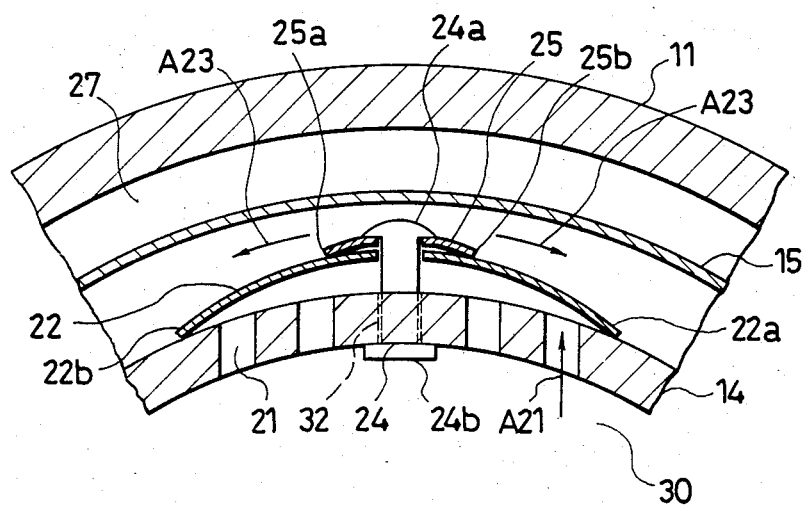
Figure 15:
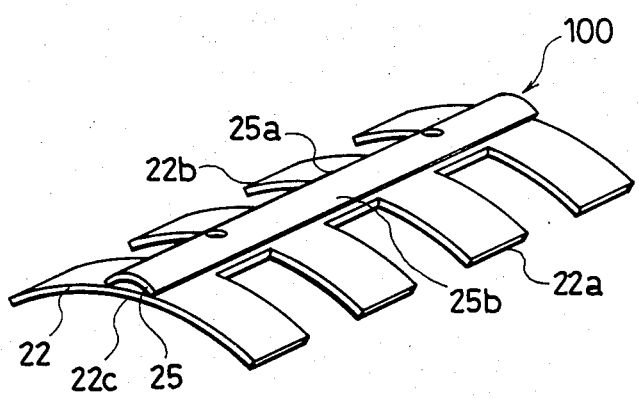

In addition, as further shown in FIG. 13, if suitable number of communicating holes 40 are provided on the protecting member 39, since a part of the fluid will flow through the passage hole 40, when the fluid flows into or flows out therefrom due to the change in the state of the fluid in the fluid passage 30, the resistance to the fluid flow caused aforesaid protecting member 39 can be reduced.

Consequently, as the distance between the flow passage 30 and the resilient diaphragm 15 is shortened and also the passage is widened, thus resulting in reduction in flow circuit resistance, thereby it becomes possible to accomplish absorption of fluid pulsation in a very effective manner.

Transverse side edges of a resilient valve member or valve shoe can be positioned halfway between the transverse side edges of a leaf spring and two opposite outer wall 21b of the communicating holes.

When a leaf spring deforms under the influence of the fluid force applied through several mating communicating holes, the transverse side edges of the resilient valve member act as supporting points or fulcrums, however, since the portion of the leaf spring above and adjacent to the communicating holes where the fluid pressure becomes highest are fully covered by mating resilient valve member, the applied fluid force is dispersed and any fluid force of appreciable extent is not applied to the part of the leaf spring where it is not covered by the resilient valve member.

Figure 11:
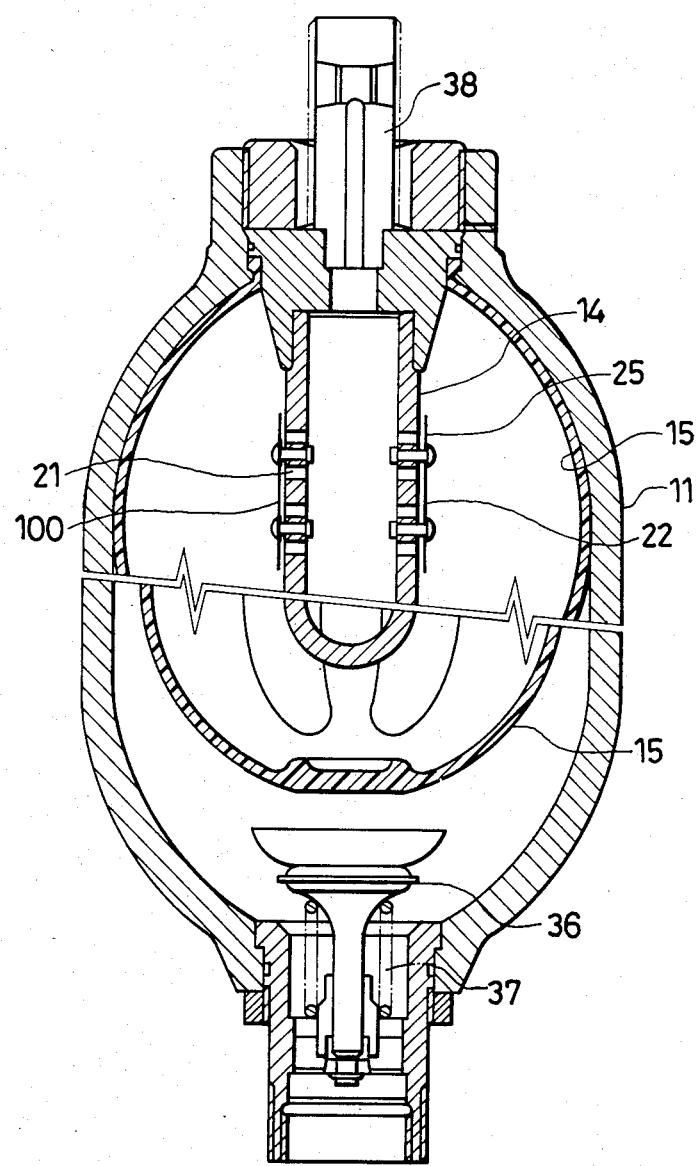
FIG. 11 is a sectional elevation showing an accumulation including an embodiment of the invention which corresponds to that shown in FIG. 1.
Figure 12:
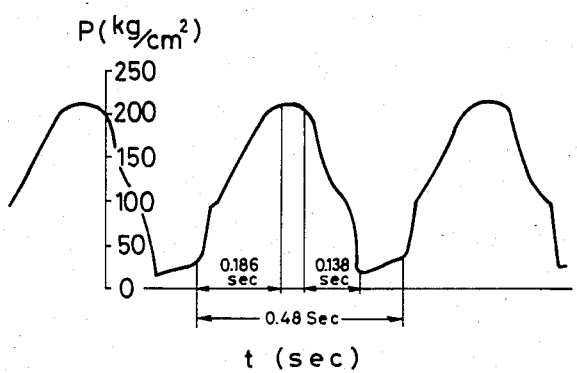
FIG. 12 is a graph showing a wave form of the applied pressure in the experimental test of the present invention.

FIG. 11 shows a transfer barrier which can also be used for transferring a fluid, to which the present invention is applicable, too. In the drawing, 36 denotes a poppet valve, 37 is a poppet valve spring and 38 is a connecting plug.

Further embodiment of this invention will be explained now, an arched valve 100, consisting of a leaf spring 22 and a resilient valve member 25 is constructed, as shown in FIGS. 14 through 17, in such a manner that the arched leaf spring 22 is assembled at the radially inner side of, namely, below the arched resilient valve member 25 in the drawings and is capable of being freely raised or lowered depend on the extent of the applied pressure.

When the pressure of the fluid flowing from the inlet cylinder 12 (FIG. 1) the outlet cylinder decreases letting the pressure of the gas, confined in the gas chamber 27 defined between the resilient diaphragm 15 and the pressure vessel, becomes higher than the fluid pressure accompanying depression of the resilient diaphragm 15 to ward the center of the inner cylinder 14, then the head 24a of a pin 24 is urged by the resilient diaphragm 15 in the same direction.

By this movement, the both transverse side edge 25a and 25b of the resilient valve member 25, together with the both side edge 22a and 22b of the leaf spring 22, will slide in the direction as shown by the arrow line A23 (FIGS. 2, 14), thus resulting in a deformation to expand their arch, as a whole. Finally, these related parts transform from the state shown in FIG. 14 to that shown in FIG. 17, thereby the communicating holes 21 of the inner cylinder 14 will be completely covered by the leaf spring 22.

If the fluid pressure in the inner cylinder increases exceeding that in the gas chamber 27, the fluid is allowed to flow through the communicating holes 21 in the direction of the arrow line A21, rendering the leaf spring 22 to leave away from the inner cylinder 14 and urges and expands the resilient diaphragm 15.

Figure 16:
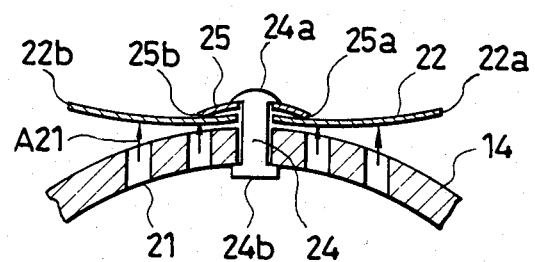
Figure 17:
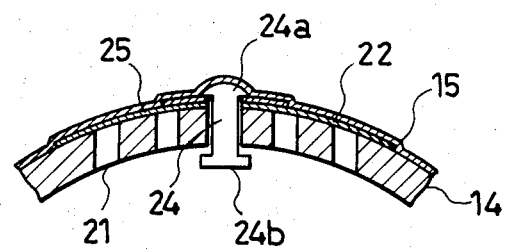
Figure 18:
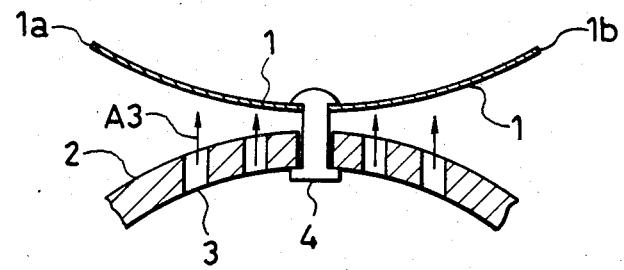
FIG. 18 is a sectional elevational view showing the device of the prior art.

Under this condition, the leaf spring 22 is subjected to a fluid force directed to the direction shown by the arrow line A21, so the leaf spring is deformed while being supported by the two opposite transverse side edges 25a and 25b of the resilient valve member 25, while the two opposite side edges 22a and 22b of the leaf spring 22 will take a change of shape from the state shown in FIG. 17 to the state being somewhat jumped up as shown in FIG. 16, thereby the communicating holes 21 of the inner cylinder are fully opened.

In the manner as described heretofore, when each leaf spring is elastically deformed performing the action of closing or opening the passage of fluid through the communicating holes, since the force acting on the leaf spring is supported by or dispersed by the transverse side edges or entire body of the valve, there arises no problem of stress concentration on the valve near the head of the pin.

Since the extent of the deformation of the leaf spring can be reduced, the leaf spring can be prevented from being damaged.

I claim:

1. A pulsation absorbing device comprising: a cylindrical pressure vessel; a cylindrical resilient diaphragm and an inner cylinder; and one or more communicating holes formed around a periphery of said inner cylinder, said cylindrical resilient diaphragm and said inner cylinder being disposed within said pressure vessel, said inner cylinder being concentric with said vessel and with said diaphragm; valve means for said device comprising, one or more arched resilient valve members and one or more separate arched leaf springs laminated with each other and disposed along the outer surface of said inner cylinder with said leaf springs in position to cover said communicating holes, said leaf springs being capable of being raised or lowered dependent upon the extent of applied fluid pressure to open and close said communicating holes; said valve members each having an at rest radius substantially equal to the radius of the inner cylinder plus the thickness of the leaf spring and the at rest radius of the leaf spring being less than the radius of said inner cylinder so that such communicating holes are opened when the laminated valve members and leaf springs are not acted upon by fluid flow and/or diaphragm urging.

2. A pulsation absorbing device as claimed in claim 1, wherein said leaf spring or springs are disposed radially inside of said resilient valve member.

3. A pulsation absorbing device as claimed in claim 2, wherein said leaf spring or springs are provided with one or more communicating holes.

4. A pulsation absorbing device as claimed in claim 2 wherein each resilient valve member has transverse side edges positioned between the transverse side edges of the leaf spring and the communicating hole covered by said leaf spring.

5. A pulsation absorbing device as claimed in claim 2, wherein said valve means is composed of a plurality of valve members laminated one after another.

6. A pulsation absorbing device as claimed in claim 5, wherein each of said plurality of laminated valve members is successively smaller in size.

7. A pulsation absorbing device as claimed in claim 2 wherein each resilient valve member is provided with a protecting member at its radially outer side to shield the laminated valve members from contact with the resilient diaphragm.

* * * * *